United States Patent [19]

Awipi

[11] 3,742,143

[45] June 26, 1973

[54] LIMITED VOCABULARY SPEECH RECOGNITION CIRCUIT FOR MACHINE AND TELEPHONE CONTROL

[75] Inventor: Mebenin Awipi, Ocean, N.J.

[73] Assignee: Bell Telephone Laboratories, Incorporated, Murray Hill, N.J.

[22] Filed: Mar. 1, 1971

[21] Appl. No.: 119,551

[52] U.S. Cl............. 179/1 SA, 179/1 VC, 179/90 B

[51] Int. Cl.............................................. G10l 1/02

[58] Field of Search............ 179/1 VC, 1 SA, 1 SB, 179/1 HF, 90 B, 15.55 R; 324/77

[56] References Cited

UNITED STATES PATENTS

| | | | |
|---|---|---|---|
| 3,234,392 | 2/1966 | Dickinson | 179/1 SA |
| 3,198,884 | 8/1965 | Dersch | 179/1 SA |
| 3,211,832 | 9/1965 | Putzrath | 179/1 SA |
| 3,445,594 | 5/1969 | Kusch | 179/1 SA |
| 3,238,303 | 3/1966 | Dersch | 179/1 SA |
| 3,416,080 | 12/1968 | Wright | 179/1 SA |
| 3,612,766 | 9/1971 | Ferguson | 179/1 HF |
| 3,234,332 | 2/1966 | Blair | 179/1 SA |
| 3,261,916 | 7/1966 | Bakis | 179/1 SA |
| 3,470,321 | 9/1969 | Dersch | 179/1 SA |

*Primary Examiner*—Kathleen H. Claffy
*Assistant Examiner*—Jon Bradford Leaheey
*Attorney*—W. L. Keefauver and Edwin B. Cave

[57] ABSTRACT

Machine or telephone control by voiced commands is attained by translating the electrical signal derived from an acoustic signal or spoken word into a plurality of binary parameter waveforms each indicating sequentially the instantaneous condition or measurement of the corresponding parameter in terms of its being on either one side or the other of a preselected threshold or norm. A command output signal is generated only when the waveforms are found to have a particular sequence of binary parameter combinations that is acceptable to a sequential logic recognition circuit.

3 Claims, 6 Drawing Figures

INVENTOR
M. AWIPI
BY E J Olinder
ATTORNEY

LIMITED VOCABULARY SPEECH RECOGNITION CIRCUIT FOR MACHINE AND TELEPHONE CONTROL

BACKGROUND OF THE INVENTION

1. Field of the Invention

This invention relates to systems and machines, including telephone sets, that are operatively responsive to acoustic power. More particularly, the invention relates to voiced command recognition arrangements used for control purposes.

2. Description of the Prior Art

In the area of machine control, the effective and economical use of mechanical translation of voiced commands to achieve machine operation is an attractive but elusive goal of long standing. Viewed from the standpoint of pure theory, machine translation of the human voice into written speech or corresponding mechanical indicia based on word recognition would appear to be well within the reach of the powerful tools provided by modern computers and related electronic technology. Early steps toward machine translation of voiced speech are illustrated in U.S. Pat. No. 2,195,081 issued Mar. 26, 1940 where H. W. Dudley discloses a "sound printing mechanism." By an essentially electromechanical system, voiced speech is translated into electrical signals that are used for the actuation of keys that type out corresponding phonetic symbols. Further translation of such symbols into machine commands, however, is not a simple undertaking owing in part to the awesome complexities of human speech, including, for example, the countless variations that occur among individuals in terms of dialect, accent, pronunciation and acoustic quality. Nevertheless, some additional progress in the field of machine translation has been made and currently available systems include the capability of converting a dozen or two different voiced orders into electrical machine control signals. Such systems are still unduly complex, however, and as a result lack the reliability required to achieve a substantial degree of effective machine control capability in any broad commercial sense. Additionally, their high cost continues to create a barrier against practical exploitation much beyond laboratory or experimental application.

Accordingly, a broad object of the invention is to reduce the cost and complexity of acoustically responsive machine control systems, including systems based on command recognition for the acoustic operation of telephone sets.

SUMMARY OF THE INVENTION

The stated object and additional objects are achieved within the principles of the invention by a system that employs a relatively limited vocabulary of commands, such as a half dozen or less for example. These commands are selected on the basis of how closely they in fact describe or fit a particular ordered action and how readily they may be identified in terms of a sequence of different combinations of preselected binary parameters. Speech may be analyzed in terms of a variety of parameters including, for example, duration, distribution of formants, total energy content, energy content at preselected intervals, zero crossing patterns, instantaneous frequency and envelope patterns among others. In accordance with the invention, two or more of these parameters having suitable characteristics are selected to define commands. The most significant characteristic is that each parameter is required to be identified in binary form, which is to say that at any given time during a command a parameter magnitude or other measure must be capable of expression in terms of its relation with respect to a preselected level or norm, i.e., either "high" or "low." A spoken command may thus be converted into a plurality of simultaneous binary waveforms which, in effect, define the profiles of the chosen parameters.

In one illustrative embodiment of the invention, parameters of instantaneous energy content and frequency are employed. A preselected median level dividing relatively high and low magnitudes for each of these parameters provides the basis for binary definition. With this arrangement there is available a total of four possible binary combinations or events, and in accordance with the invention, it is the detection of the occurrence of these events and the sequence in which they occur that provides the information for command recognition. By selecting a command of reasonable duration, four or five sequential events are made available for definition purposes, and a simple asynchronous logic circuit is used to make the decision as to whether the analyzed command is in fact a part of the programmed vocabulary.

The particular use to which a word recognition signal may be put is of course dependent on the nature of the machine to be controlled. In the case of telephony, for example, it can be shown that complete operation of a repertory dialer set can be carried out with a relatively simple system of secondary logic requiring only a total of five commands.

DETAILED DESCRIPTION

Figure 1:
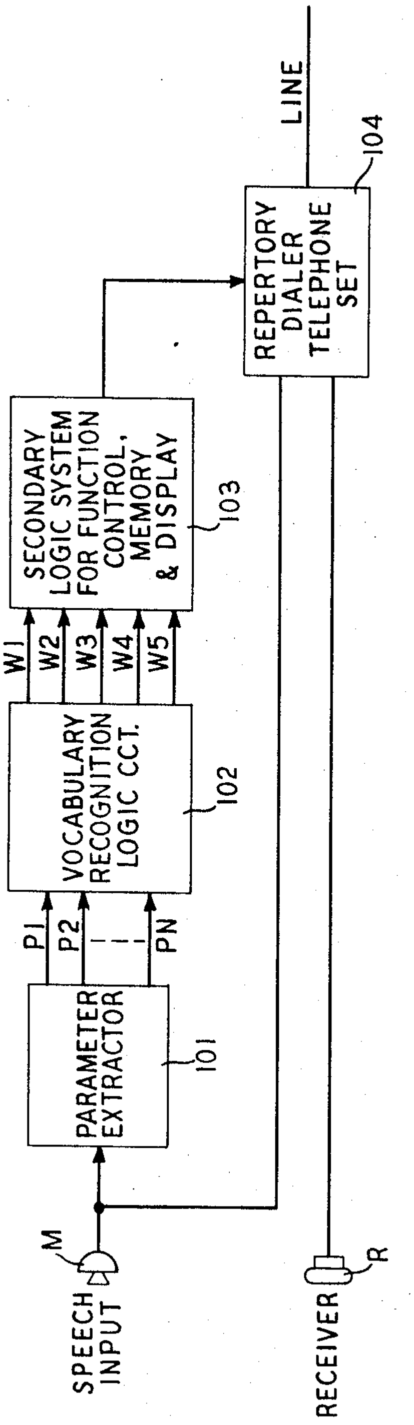
FIG. 1 is a simplified block diagram of apparatus for operating a telephone set in accordance with the invention.

The broad principles of the invention are shown in FIG. 1 where a command recognition system, which includes a parameter extractor 101, a vocabulary recognition logic circuit 102 and a secondary logic system 103, is used to control a repertory dialer telephone set 104. It is important to note at the outset that any effective voiced command recognition circuit must work for a general adult population, which is to say that it must be capable of recognizing consistently and without confusion the selected words when pronounced in isolation by any male or female adult speaker. Without this consistency, it would be necessary to tune the system for every speaker which would, of course, be prohibitively expensive. This need for consistency is met in accordance with the invention by employing a set of binary parameter waveforms which are extracted from the conventional speech waveform. It is this function that is performed by the parameter extractor 101 of FIG. 1.

The choice of binary waveforms contributes directly to cost reduction in the system by eliminating expensive analog-to-digital converters between the parameter extractor 101 and the vocabulary recognition logic circuit 102. Moreover, this approach indirectly contributes toward simplifying the recognition circuit. The most important advantage gained from the use of binary waveforms, however, is that of enhanced consistency in the accuracy of command translation.

Figure 3:
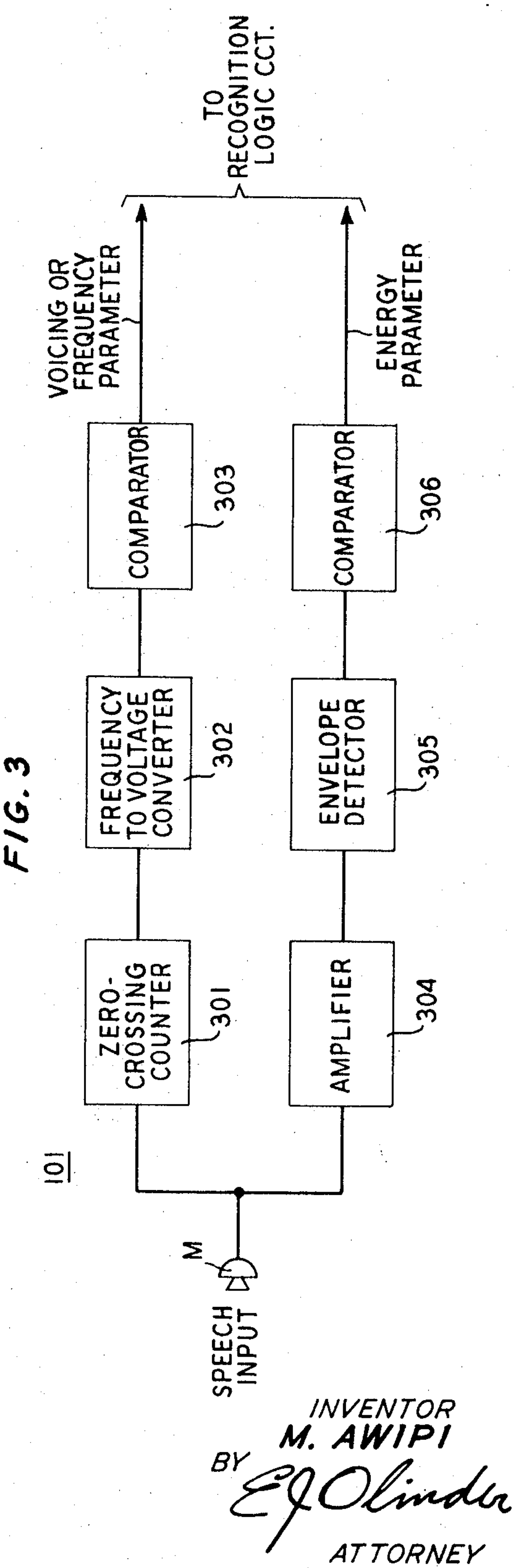
FIG. 3 is a block diagram of the parameter extractor shown in single block form in FIG. 1.

The electrical waveform generated by the microphone M when a word is uttered contains only limited information about the word spoken, and the waveform varies widely from speaker to speaker particularly in its instantaneous frequency content. The principles of the invention are based in part on the realization that the most consistent information that can be extracted from the electrical signal corresponding to a voiced command is in terms of broad boundaries of segments with relatively high or low frequencies and with relatively high or low energy content. More detailed apparatus for deriving such parameter information is shown in FIG. 3. The first or frequency parameter apparatus consists of a series combination of a zero crossing counter 301, a frequency-to-voltage converter 302 and a comparator 303. The second or energy parameter apparatus, which is connected in parallel with the first parameter apparatus, consists of the series combination of an amplifier 304, an envelope detector 305 and a second comparator 306. In accordance with the invention, one can obtain additional information from essentially the same parameter extractors by setting up several comparators in parallel, each with a different threshold.

Figure 4A:
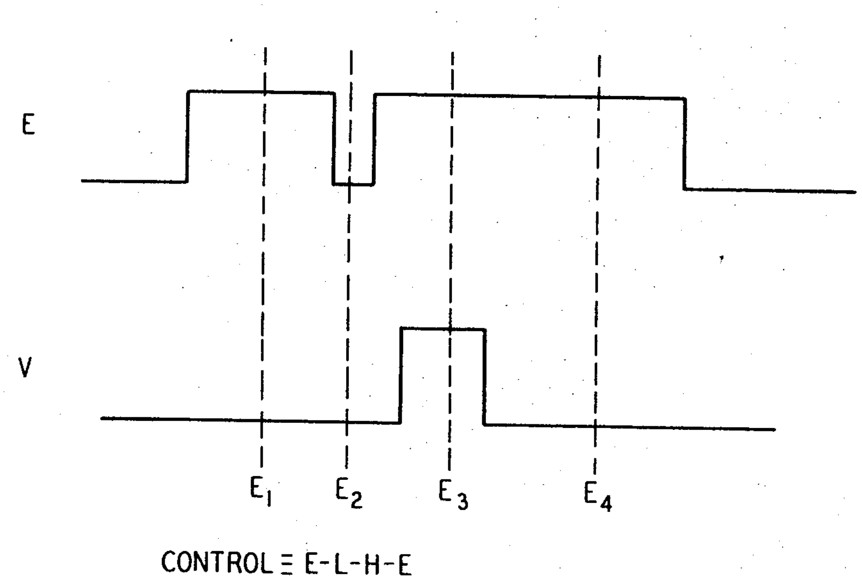
FIG. 4A is a plot of the parameter waveforms in accordance with the invention for a first illustrative command.
Figure 4B:
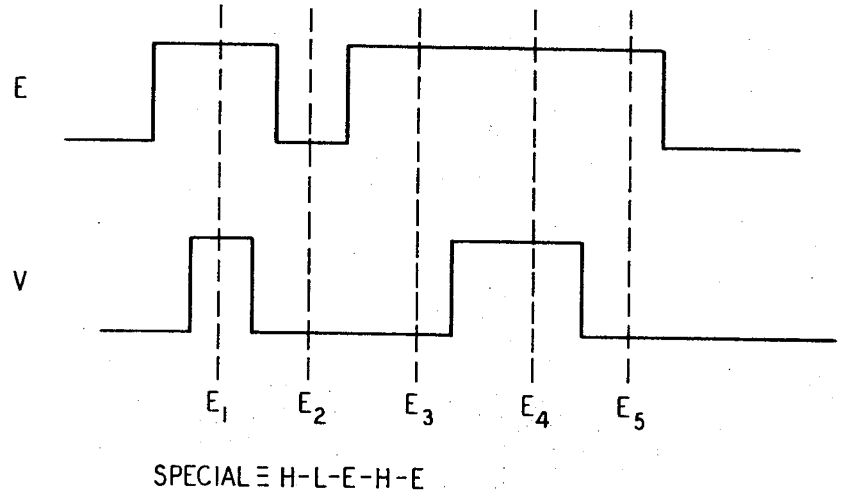
FIG. 4B is a plot of the parameter waveforms in accordance with the invention for a second illustrative command.

The most effective threshold or high-low dividing level for the voicing or frequency parameter has been found to be between 1.4 and 1.6 KHz. Thus, as shown in FIGS. 4A and 4B, the V waveforms for the commands CONTROL and SPECIAL show at each point throughout the duration of the voiced command whether the instantaneous frequency content is above or below the selected threshold. Similarly, in the case of the energy parameter, the resultant E waveforms for the two illustrative commands show at each instant over the duration of the spoken command whether the energy content is relatively high or relatively low with respect to a preselected energy threshold. It has been found that the desired degree of recognition consistency may be readily obtained by empirical adjustment of these two thresholds. It is of course possible to employ more than two parameters for a given set of words, and this approach is at times desirable to aid in distinguishing between borderline cases. It must be realized, however, that the possibility of overrefinement may result in a loss in consistency.

The limitations associated with the choice of binary parameter waveforms concern, primarily, the size of the vocabulary of words which the system can recognize without confusion among legitimate members of the set and the degree of discrimination against other similar sounding words. Both of these limitations are taken into consideration in the use of the apparatus shown in FIG. 3 and in the resultant waveforms of FIGS. 4A and 4B. It is to be noted that both of the parameters V and E can switch independently of each other asynchronously from one state to the other. Thus, at any instant of time, any one of four events or conditions are possible which may be defined as follows:

$H =$ VE $=$ event that both $V$ and $E$ are high, $L = \overline{VE} =$ event that both $V$ and $E$ are low, $V = \overline{VE} =$ event that $V$ is high and E is low, $E = \overline{VE} =$ event that $V$ is low and E is high.

As seen from FIG. 4A, the sequence of events $E_1$ through $E_4$ for the parameter waveforms of the command CONTROL is "E-L-H-E." Similarly, as seen from FIG. 4B, the sequence of events $E_1$ through $E_5$ for the parameter waveforms of the command SPECIAL is "H-L-E-H-E."

Assume, for example, that command words of sufficient acoustic duration are selected to allow the occurrence of three events when each is pronounced in isolation. Then, eliminating the need to detect the occurrence of the same event consecutively, the maximum number of words which can be differentiated from each other is $4 \times 3 \times 3 = 36$. Although some of these words will not have grammatical meaning, there is a strong likelihood of being able to obtain at least five legitimate words from the group that are suitable for machine command purposes. As an aid in the choice of words one may note the rough correspondence between the events and certain acoustic features. For example, the events H and E are associated with vowel segments, the event L with stop consonants or plosives and the event V with fricative consonants.

Figure 5:
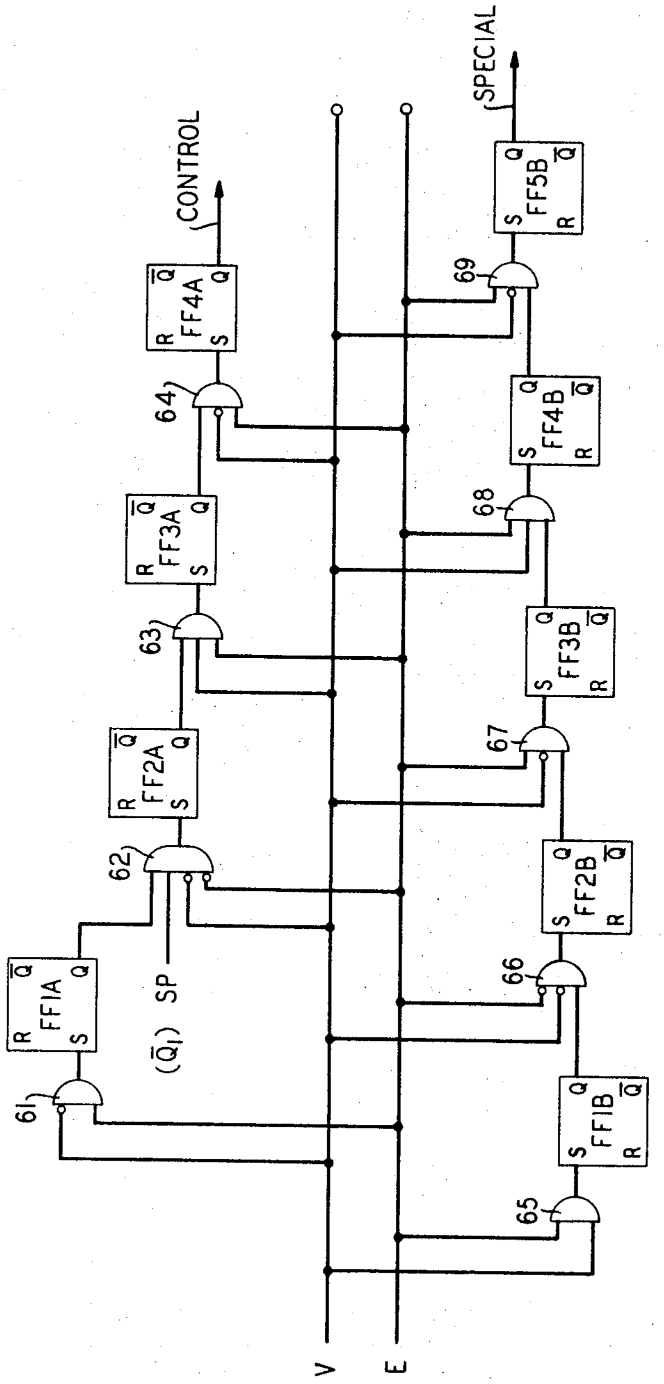
FIG. 5 is a block diagram of the recognition logic circuitry required to identify the parameter waveforms of FIGS. 4A and 4B.

The recognition logic circuit for the two command words CONTROL and SPECIAL is illustrated in FIG. 5. Recognition logic for the command CONTROL includes the flip-flop circuits FF1A through FF4A and the AND gates 61 through 64. For the command SPECIAL the logic includes a total of five flip-flops FF1B through FF5B and a total of five AND gates 65 through 69. In the interest of clarity and simplicity of explanation the asynchronous clock which is used in conventional fashion to reset each of the flip-flops and which is accordingly connected to each of the R or reset flip-flop inputs is not shown.

Operation of the circuit of FIG. 5 is straightforward. Consider for example the sequence for the command SPECIAL. The occurrence of the event $E_1 = E$ corresponding to the input of the first AND gate 65 sets the first flip-flop FF1B. The fact that the event $E_1$ has occurred previously as registered by the flip-flop FF1B and the occurrence of event $E_2$ next sets the flip-flop FF2B. Before the occurrence of the event $E_1$, however, the occurrence of the event $E_2$ can have no effect on the recognition sequence of this word. Operation of the SPECIAL logic circuit through the rest of its cycle, including the events $E_3$, $E_4$ and $E_5$ as well as the complete operation of the CONTROL logic circuit through the events $E_1 - E_4$ may similarly be traced.

When recognition of more words is desired, additional inputs to the AND gates can be taken from the flip-flop outputs of adjacent recognition sequences to avoid confusion among legitimate words as indicated by the $(\overline{Q}_1)_{SP}$ input to AND gate 62 in the CONTROL logic sequence. The asynchronous clock (not shown) ensures the resetting of all flip-flops after every attempted recognition to provide further security against possible false operation. One particularly important feature of the recognition circuit shown in FIG. 5 is that its operation is unaffected by the speed with which a word is pronounced.

Figure 2:
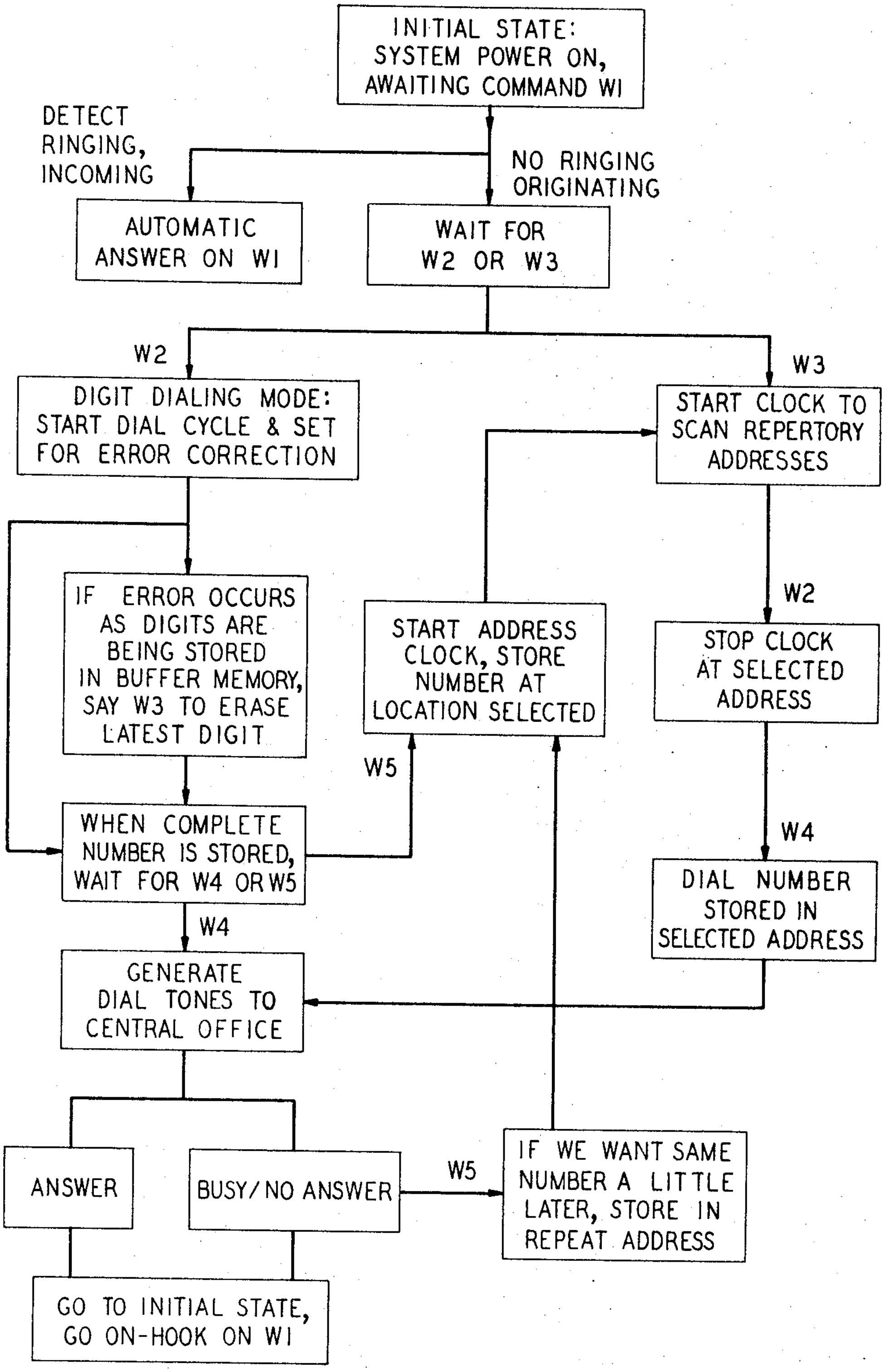
FIG. 2 is a block diagram of a decision tree for the secondary logic of FIG. 1.

Utilization of the outputs from the circuit shown in FIG. 5 is illustrated broadly by the secondary logic block 103 of FIG. 1 and specifically by the decision tree for the secondary logic for a repertory dialer telephone set illustrated in FIG. 2. As shown in FIG. 1, the secondary logic 103 receives commands from the recognition circuit 102 and proceeds to perform a series of functions depending upon the words employed, in this instance a total of five words, W1 through W5, and upon the sequence in which they are spoken. In the initial state, as shown in FIG. 2, the system is powered and waiting for the initiating command W1. When the W1 command is received, the system determines whether there is an incoming call or an originating call by detecting the presence or absence of ringing current. If an incoming call is detected, then the system immediately provides a voice path for conversation.

If ringing is not detected, the system looks for either of two words, W2 or W3. If W2 is spoken, the system is transferred automatically into a digit dialing mode. Although dialing may be accomplished by voiced commands translated in the manner described above, a preferred dialing method is that disclosed by C. J. Hoffman in his application, Ser. No. 101,817, filed Dec. 28, 1970. In Hoffman's system, a clock is started to initiate dialing which cyclically lights up a display of the digits "0" through "9" in sequence. The coincidence of the digit lighting and any voiced command, which may or may not be the voiced digit, effects the selection of that digit. The digit so selected is simultaneously stored in a local memory and displayed visually for feedback to the user. If an error is made selecting a digit, the word W3 spoken at this point results in erasing the last digit from both the memory and the display. When the complete telephone number has been placed in the temporary memory and verified from the display, the word W4 or W5 is spoken. If the word W4 is spoken, the tones corresponding to the number are generated and dialed to the central office. If the word W5 is spoken, then a repertory address clock, not shown, is started and an address is selected in a manner similar to that described in the digit selection process. The number in temporary memory is then stored in permanent memory at the selected address for later recall and dialing.

If, however, after the initiating command W3 is spoken instead of W2, then the repertory address clock is started and an address may be selected as before. In this case, a number previously stored in that address is transferred to the temporary memory and display. At the utterance of W4, this number is then dialed to the central office.

In either case, if the called party answers, the system goes to the initial state and at the end of the conversaion the utterance of W1 causes the set to hang up. If the line is busy, the user can either hang up as before, or if the number will be called again, it can be stored in a REPEAT section of the repertory dialer memory.

In the secondary logic illustrated by FIG. 2 it should be noted that at all decision nodes the system has only two choices to make which provides the basis for a typical binary approach. Thus only two words, indicating either of two paths, would suffice to control the internal sequence of events. In fact, if a preferred direction is provided, then only a single word would be necessary for the control function. However, the use of one or two words is not desirable from human factor considerations inasmuch as there would be little or no relation in meanings between the words and the actions which are effected by the logic circuits internally. By a choice of four or five words, however, it is found that sufficient correspondence is provided between the words and the control actions. It should also be noted that not all of the features described in the secondary logic are critical. For example, the error correction feature or indeed the repertory feature may be omitted thereby reducing the number of words necessary to effect voice control of the secondary logic without meaningless coding.

It is to be understood that the use of the command recognition system of the invention in operating a repertory dialer telephone set is merely illustrative of the wide variety of machine control uses that may be served in a similar fashion.

What is claimed is:

1. Speech recognition apparatus for machine control comprising, in combination, first means for translating audio speech into a corresponding electrical analog signal, second means for translating said analog signal into a plurality of binary signals comprising, a first circuit including zero crossing counter means, frequency-to-voltage converter means and first comparator means in a first serial combination, amplifier means, envelope detector means and second comparator means in a second serial combination, said first and second combinations being connected in parallel relation, said electrical analog signal being applied to said combinations from said first translating means, said binary signals each having a waveform presenting a first and a second level, each of said levels in each of said waveforms being indicative of the magnitude of a respective preselected speech parameter as being either above or below a respective preselected threshold level of said last named parameter, said combinations of said second translating means being responsive to a transition from either one of said levels to the other in any of said waveforms to generate a distinctive signal indicative of said transition, and word recognition logic circuitry responsive to a combination of said distinctive signals for generating an output signal uniquely indicative of a word or command as determined from said audio speech.

2. Apparatus in accordance with claim 1 wherein said logic circuitry includes a system of secondary logic responsive to said output signal for the operation of a repertory dialer telephone set.

3. Apparatus in accordance with claim 1 wherein said logic circuitry comprises a plurality of series connected combinations of flip-flops, said combinations being equal in number to the number of words or commands to be recognized, the number of said flip-flops in each of said combinations being equal to the highest number of said transitions that occur in either of the binary waveforms associated with the corresponding one of said words or commands, an AND gate connected between each adjacent pair of said flip-flops, each of said gates having an input from the preceding flip-flop of said pair and from the outputs of said first and second comparators, and an additional AND gate connected between said comparators and a respective first one of said flip-flops, said last named AND gate having inputs only from said comparators and having an output to said last named flip-flop, said inputs to all of said AND gates being either direct or inverted in accordance with whether the binary waveform associated with the related word to be recognized and with a particular one of said last named inputs has undergone one of said transitions at an immediately preceding point in time, an output from the last flip-flop in one of said combinations of flip-flops signifying the reception of an associated spoken word or command.

* * * * *